US006954418B2

United States Patent
Yanagawa et al.

(10) Patent No.: US 6,954,418 B2
(45) Date of Patent: Oct. 11, 2005

(54) APPARATUS FOR ADJUSTING SIGNAL LEVELS DERIVED FROM AN OPTICAL DISC TO BECOME EQUAL TO A REFERENCE LEVEL DETERMINED FROM AT LEAST ONE OF THE SIGNAL LEVELS OF THE SIGNALS AND FOR SYNTHESIZING THE SIGNALS

(75) Inventors: Naoharu Yanagawa, Tokorozawa (JP); Masahiro Kato, Tokorozawa (JP); Tatsuhiro Yone, Tokorozawa (JP); Yuko Muramatsu, Tokorozawa (JP); Shinji Suzuki, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 505 days.

(21) Appl. No.: 10/067,539

(22) Filed: Feb. 7, 2002

(65) Prior Publication Data

US 2002/0114261 A1 Aug. 22, 2002

(30) Foreign Application Priority Data

Feb. 9, 2001 (JP) ........................................ 2001-033485

(51) Int. Cl.$^7$ ................................................ G11B 7/00
(52) U.S. Cl. ........................... 369/124.15; 369/124.14; 369/124.12; 369/53.23
(58) Field of Search ..................... 369/124.15, 124.14, 369/124.12, 53.23

(56) References Cited

U.S. PATENT DOCUMENTS 3,832,066 A * 8/1974 Cornsweet .................... 356/127
4,980,773 A * 12/1990 Suda et al. .................... 348/355
4,998,234 A * 3/1991 Rees et al. ................. 369/44.27
5,293,569 A * 3/1994 Koyama .................. 369/112.19
5,339,302 A * 8/1994 Takahashi et al. ......... 369/53.22
6,172,560 B1 * 1/2001 Yamashita et al. ............. 330/52
6,424,609 B1 * 7/2002 Masakado ................. 369/53.22
6,563,773 B1 * 5/2003 Yanagisawa et al. ..... 369/44.41

FOREIGN PATENT DOCUMENTS

JP 2000-132835 5/2000

* cited by examiner

Primary Examiner—Gautam R. Patel
(74) Attorney, Agent, or Firm—McGinn & Gibb, PLLC

(57) ABSTRACT

A plurality of light receiving detectors receive a plurality of segments of a beam returning from an optical disc when a reading beam of light is radiated to the optical disc. An optical pickup assembly produces a plurality of signals from the beam segments in accordance with, for instance, optical intensities of the beam segments. A level adjusting circuit adjusts signal levels of these signals such that each of the signal levels of the signals becomes equal to a reference level. The reference level is determined from at least one of the signal levels of the received beam segments.

25 Claims, 3 Drawing Sheets

APPARATUS FOR ADJUSTING SIGNAL LEVELS DERIVED FROM AN OPTICAL DISC TO BECOME EQUAL TO A REFERENCE LEVEL DETERMINED FROM AT LEAST ONE OF THE SIGNAL LEVELS OF THE SIGNALS AND FOR SYNTHESIZING THE SIGNALS

BACKGROUND OF THE INVENTION

1. Field of the Invention

The present invention relates to an apparatus for recording signals on an optical disc and reproducing signals from the optical disc, and more particularly to an apparatus for synthesizing signals derived from an optical disc.

2. Description of the Related Art

When an optical disc is used to record and reproduce an information signal, a beam of light is radiated on a recording layer of the optical disc and a returning beam is received by a plurality of light receiving planes (detectors) to obtain a plurality of signals. Each light receiving plane (detector) receives part of the returning beam. The part of the returning beam is referred to as a returning beam segment in this specification. The signals prepared by the light receiving planes are synthesized to create a so-called RF signal used for reproduction of the information signal, a servo signal used for focusing and tracking, or a detection signal used for detection of a pre-pit. A signal synthesizing apparatus is employed when synthesizing the signals returning from the recording layer of the optical disc.

One example of such signal synthesizing apparatus is disclosed in Japanese Patent Kokai (Laid-Open Publication) No. 2000-132835. The signal synthesizing apparatus uses a plurality of light receiving planes to capture a returning light beam. It is therefore ideal that all the light receiving planes have the same light receiving characteristics. In reality, however, it is impossible for the light receiving planes to have the same light receiving characteristics. In order to deal with this problem, the signal synthesizing apparatus of Japanese Patent Kokai No. 2000-132835 relies upon variable gain amplifiers to adjust signal levels of the returning light beam segments such that the signal levels of the returning light beam segments become equal to a predetermined reference value.

Practically, however, a plurality of light receiving elements which constitute each light receiving plane have great variation in optical and physical characteristics. In addition, the reference value mentioned above cannot be separated from the signal levels of the returning light beam segments in order to insure an appropriate functioning of the variable gain amplifiers. This imposes considerable limitations on determination (selection) of the reference value and design of a feedback circuit including the variable gain amplifiers.

SUMMARY OF THE INVENTION

An object of the present invention is to provide a signal synthesizing apparatus for an optical disc which can be easily designed and which has a relatively simple circuit structure.

According to one aspect of the present invention, there is provided a signal synthesizing apparatus comprising: an optical pickup having a plurality of light receiving planes (detectors) for receiving a beam returning from an optical disc when a reading beam of light is radiated to the optical disc, and for producing a plurality of signals from segments of the returning beam in accordance with, for example, optical intensities of the returning beam segments; adjusting means for adjusting signal levels of the signals such that each of the signal levels becomes equal to a reference value determined from at least one of the signal levels; and synthesizing means for synthesizing the signals after the signal levels are adjusted by the adjusting means to obtain a synthesized signal. Since the reference value is decided on the basis of the signal level(s) of the returning light beam segment(s), there is no need to separately or specially prepare a reference value. Therefore, the signal level adjustment is simplified. Further, the whole circuit structure is simplified. This contributes to a reduction of manufacturing cost of the signal synthesizing apparatus.

DETAILED DESCRIPTION OF THE INVENTION

Embodiments of the present invention will be described in reference to the accompanying drawings.

Figure 1:
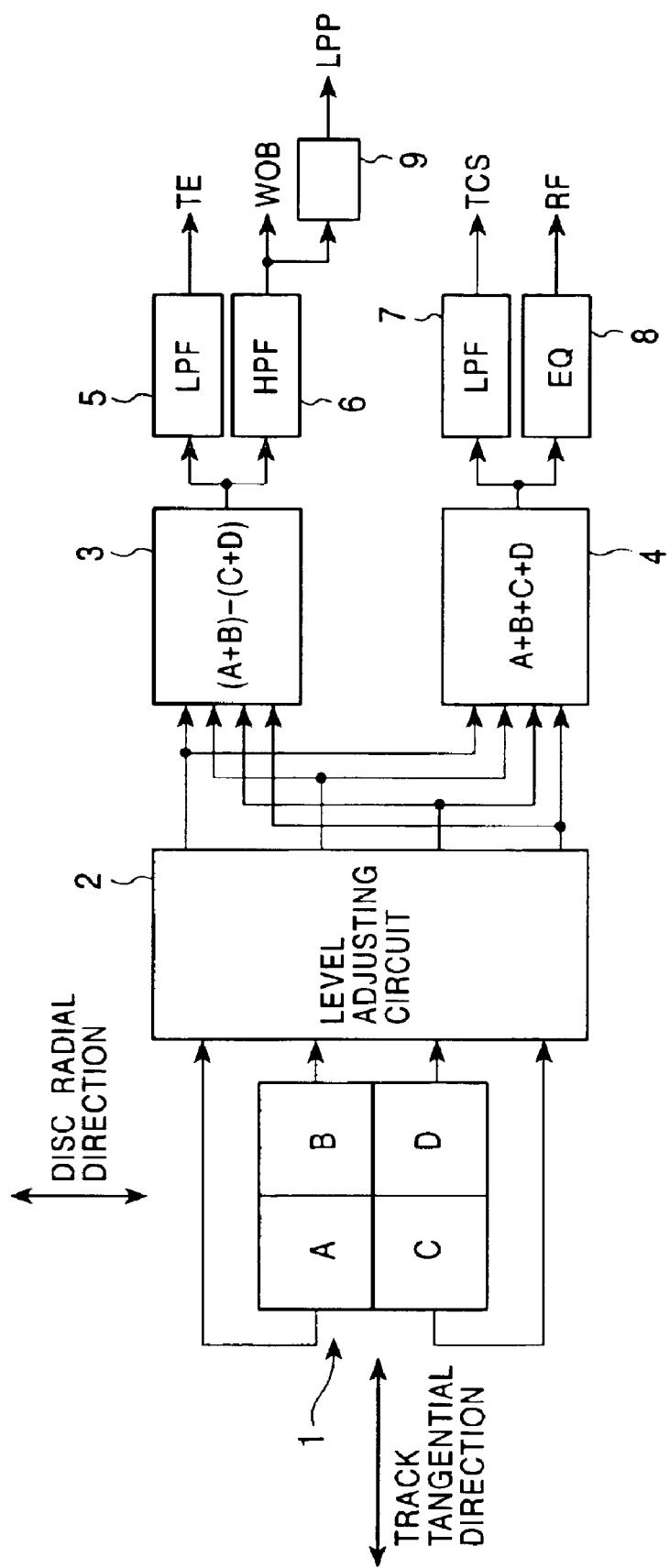
FIG. 1 illustrates a block diagram of a signal synthesizing apparatus according to the present invention.

Referring to FIG. 1, illustrated is an apparatus for synthesizing a plurality of signals derived from a light returning from an optical disc according to the present invention.

A single beam of light is radiated to an optical disc (not shown) from a light source (not shown), and a returning beam from the optical disc is passed through an intermediate optical system or assembly (not shown) and received by four light receiving planes (detectors) A, B, C and D. A single light receiving unit 1 includes the four planes A to D. The returning beam includes four segments, which are respectively received by the four detectors A to D. Although not illustrated, the light source and the intermediate optical system are parts of an optical pickup which is connected with the light receiving unit 1. The position of the optical pickup is controlled relative to the optical disc by a focusing servo or tracking servo mechanism.

Signals of the returning beam segments received at the planes A to D are supplied to a level adjusting circuit 2 respectively. These signals are referred to as signals A to D respectively. The level adjusting circuit 2 appropriately adjusts the signal levels of the received beam segments and supplies the adjusted signal levels to first and second signal synthesizing circuits 3 and 4. The first signal synthesizing circuit 3 creates a first synthesis (composite) signal having a signal level in accordance with an operation: (Signal A+Signal B)−(Signal C+Signal D). The second signal synthesizing circuit 4 creates a second synthesis signal having a signal level in accordance with an operation: (Signal A+Signal B+Signal C+Signal D).

The first synthesis signal passes through a low pass filter 5 and becomes a tracking servo signal TE. The first synthesis signal also passes through a high pass filter 6 and becomes a wobble signal WOB. The high pass filter 6 excludes a component generated from disc eccentricity included in the first synthesis signal. In the illustrated embodiment, the cutoff frequency of the high pass filter 6 is set to be as high as possible as long as it does not exert adverse affects on the 140 kHz wobble signal WOB in terms of amplitude and phase. The cutoff frequency is, for example, 14 kHz. The wobble signal WOB is introduced to a pre-pit detection circuit 9 to extract a pre-pit signal LPP. Details of the pre-pit detection circuit 9 are disclosed in Japanese Patent Kokai No. 2000-311344, assigned to the assignee of the present application. The disclosure of Japanese Patent Kokai No. 2000-311344 is incorporated herein by reference.

The second synthesis signal is transmitted to a low pass filter 7 from the second synthesizing circuit 4, and becomes a track cross signal TCS. The second synthesis signal is also transmitted to an equalizer 8 and becomes a high frequency signal (RF signal) representing recorded information of the optical disc.

The level adjusting circuit 2 performs the signal level adjustment such that the signal levels of three of the four signals A to D are adjusted to become equal to the signal level of the remaining one signal.

Figure 2:
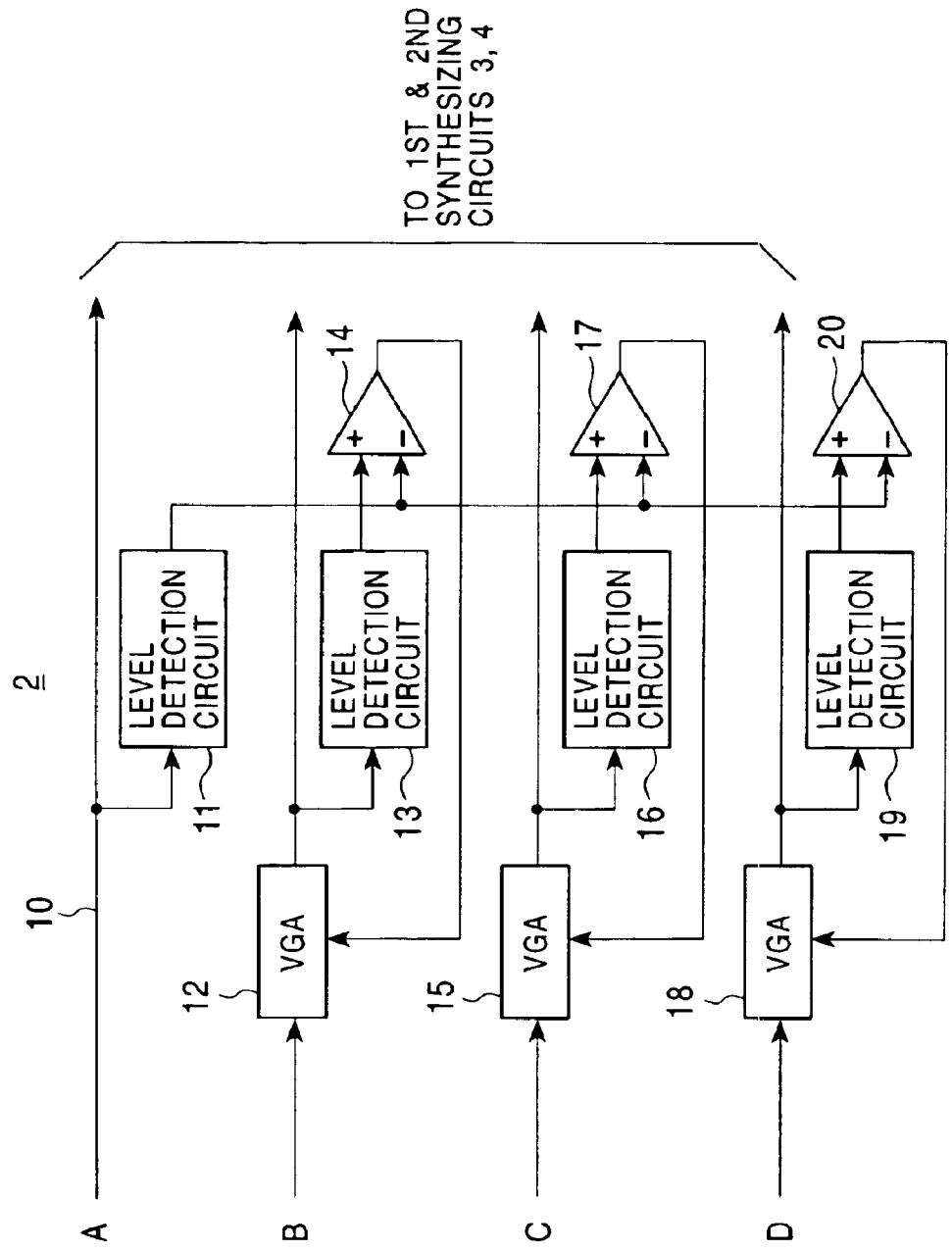
FIG. 2 illustrates a block diagram of a major portion of the signal synthesizing apparatus shown in FIG. 1.

FIG. 2 illustrates an example of the level adjusting circuit 2.

In this drawing, the signal A is directly supplied to the first and second synthesizing circuits 3 and 4 via a signal line 10. The signal A is also supplied to a level detection circuit 11. The level detection circuit 11 produces a level detection signal representing the signal level of the signal A. The signal B is amplified by a variable gain amplifier (VGA) 12 and introduced to the first and second synthesizing circuits 3 and 4. The amplified signal B is also introduced to a second level detection circuit 13. Like the first level detection circuit 11, the second level detection circuit 13 produces a level detection signal representing the signal level of the amplified signal B. The level detection signal is then introduced to one input of a comparator 14. The first level detection signal from the first level detection circuit 11 is introduced to the other input of the comparator 14. The comparator 14 creates a comparison signal having a level which represents a difference between the two input signals. The comparison signal is fed back to a control terminal of the VGA 12. The comparison signal is therefore a control signal.

The signal C is amplified by a second VGA 15 and supplied to the first and second synthesizing circuits 3 and 4. The amplified signal C is also supplied to a third level detection circuit 16. The third level detection circuit 16 creates a third level detection signal representing the signal level of the amplified signal C. The third level detection signal is supplied to one input of a second comparator 17. The first level detection signal issued from the first level detection circuit 11 is supplied to the other input of the second comparator 17. The second comparator 17 produces a second comparison signal having a level that represents a difference between the two input signals, and returns the second comparison signal to a control terminal of the second VGA 15 as a control signal.

The signal D is amplified by a third VGA 18 and supplied to the first and second synthesizing circuits 3 and 4. The amplified signal D is also supplied to a fourth level detection circuit 19. The fourth level detection circuit 19 creates a fourth level detection signal representing the signal level of the amplified signal D. The fourth level detection signal is supplied to one input of a third comparator 20. The first level detection signal issued from the first level detection circuit 11 is supplied to the other input of the third comparator 20. The third comparator 20 produces a third comparison signal having a level that represents a difference between the two input signals, and returns the third comparison signal to a control terminal of the third VGA 18 as a control signal.

The three VGAs 12, 15 and 18 of the level adjusting circuit 2 therefore adjust (amplify) the signals B, C and D such that each of the signal levels of the signals B, C and D becomes equal to the signal level of the signal A before the signals B, C and D are supplied to the first and second synthesizing circuits 3 and 4. The signal level of the signal A is not adjusted.

Since the signals A, B, C and D are adjusted as a whole to have the same level prior to introduction into the first and second synthesizing circuits 3 and 4, appropriate signal synthesis can be expected. Further, since the structure of the level adjusting circuit 2 is simpler than the prior art, the level adjusting circuit 2 can contribute to a reduction of the manufacturing cost of the signal synthesizing apparatus.

The term "signal level" of the signal A (or B or C or D) in this specification means a magnitude of the signal. The signal level may be a peak level difference of the signal, a peak level of the signal, an effective value of the signal, or an average value of the signals.

Figure 3:
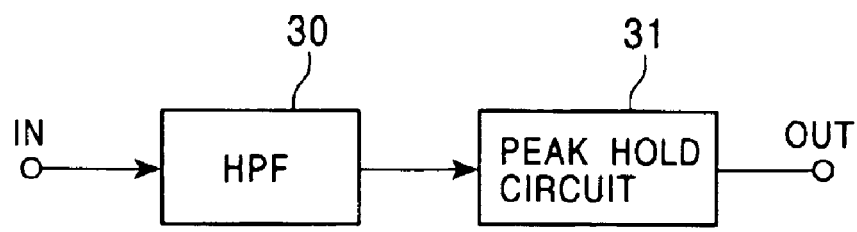
FIG. 3 illustrates a circuitry diagram of a level detection circuit shown in FIG. 2.

Referring to FIG. 3, illustrated is an example of the level detection circuit 11 (or 13 or 16 or 19) when the peak level is used as the signal level. The level detection circuit 11 includes a high pass filter 30 which allows only a high frequency portion of the signal introduced to an input IN to pass therethrough, and a peak hold circuit 31 which maintains the peak of the signal issued from the high pass filter 30 and outputs the signal from an output OUT.

Figure 4:
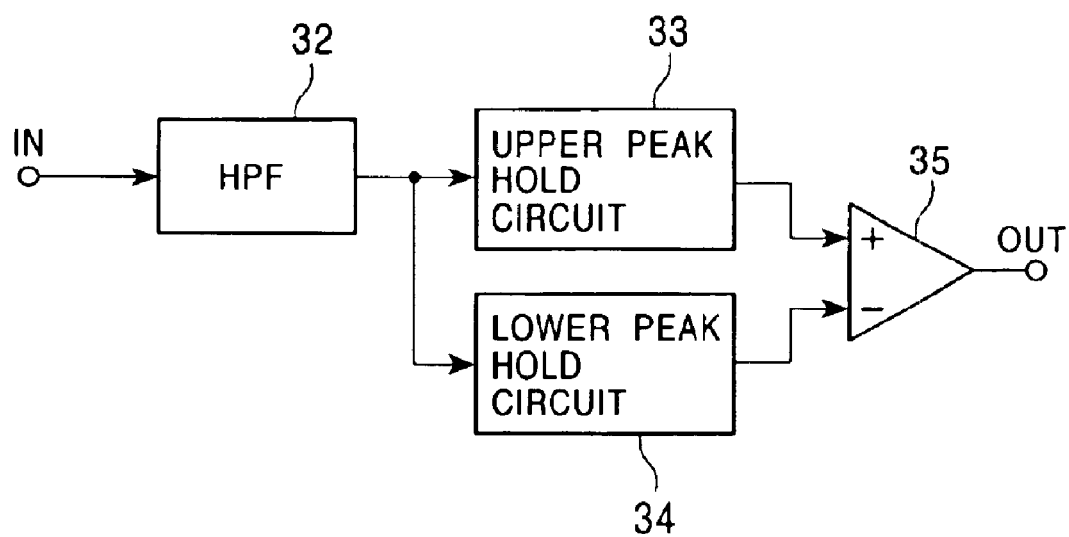
FIG. 4 illustrates a circuitry diagram of a modified level detection circuit.

Referring to FIG. 4, illustrated is another example of the level detection circuit 11 (or 13 or 16 or 19) when the peak level difference is used as the signal level. The level detection circuit includes a high pass filter 32 which allows only a high frequency portion of the signal introduced to an input IN to pass therethrough, and a pair of peak hold circuits 33 and 34. One of the peak hold circuits 33 maintains the upper peak of the output signal of the high pass filter 32 and the other peak hold circuit 34 maintains the lower peak of the output signal of the high pass filter 32. The signals resulting from the upper and lower peak hold circuits 33 and 34 are introduced to a subtraction circuit 35. The subtraction circuit 35 outputs the peak level difference (i.e., difference between the upper and lower peaks) to an output OUT.

As understood from the foregoing, a plurality of beam segments A to D received at the light receiving unit 1 undergo the level adjustment without using a separately or specially determined reference value. Indeed, the reference value used in the signal synthesizing apparatus of the illustrated embodiment is the signal level of the signal A (light A), which is received at the light receiving unit 1.

Although the signal level of the light A is utilized as the reference value in this particular embodiment, the signal level of another light such as signal B, C or D may be used. Alternatively, an average value of two or more of the signals A to D may be utilized as the reference value. The reference value which varies with (i.e., which is determined from) at least one of the signals A to D can be used as the reference value.

It should be noted that the number of the light receiving planes of the light receiving unit 1 is not limited to four, and the number of the signals to be received by the light receiving planes is not limited to four.

This application is based on a Japanese patent application No. 2001-33485, and the entire disclosure thereof is incorporated herein by reference.

What is claimed is:

1. A signal synthesizing apparatus comprising:

an optical pickup including a plurality of light receiving planes for receiving a light beam returning from an optical disc when a reading beam of light is radiated to the optical disc, and for producing a plurality of signals;

adjusting means for adjusting signal levels of the plurality of signals such that each of the signal levels of the plurality of signals becomes equal to a reference level determined from at least one of the signal levels of the plurality of signals; and synthesizing means for synthesizing the plurality of signals after the signal levels of the plurality of signals are adjusted by the adjusting means to obtain a synthesized signal, wherein the reference level comprises a signal level of one of the plurality of signals, and the adjusting means adjusts signal levels of others of the plurality of signals such that each of the signal levels of the others of the plurality of signals becomes equal to the signal level of the one of the plurality of signals.

2. The signal synthesizing apparatus according to claim 1, wherein the adjusting means includes:

a relay circuit for producing a reference level signal representing the signal level of the one of the plurality of signals, and directly transferring the one of the plurality of signals to the synthesizing means; and a plurality of amplifying relay circuits for producing subordinate level signals representing the signal levels of the others of the plurality of signals respectively, adjusting the signal levels of the others of the plurality of signals such that each of the subordinate level signals becomes equal to the reference level signal, and supplying the others of the plurality of signals having the adjusted signal levels to the synthesizing means.

3. The signal synthesizing apparatus according to claim 2, wherein the relay circuit includes a signal line for transferring the one of the plurality of signals and a first peak detection circuit for utilizing a peak level of the one of the plurality of signals on the signal line as the reference level signal, and wherein the plurality of amplifying relay circuits include:
 a plurality of variable gain amplifiers for amplifying the others of the plurality of signals with gains determined in accordance with respective control signals,
 a plurality of second peak detection circuits for utilizing peak levels of output signals of the plurality of variable gain amplifiers as the subordinate level signals respectively, and
 a plurality of difference signal producing circuits for creating difference signals representing level differences between the reference level signal and the subordinate level signals respectively and utilizing the difference signals as the respective control signals.

4. The signal synthesizing apparatus according to claim 3, wherein each of the first and second peak detection circuits includes a peak hold circuit.

5. The signal synthesizing apparatus according to claim 4, wherein each of the first and second peak detection circuits includes a high pass filter upstream of the peak hold circuit.

6. The signal synthesizing apparatus according to claim 3, wherein each of the first and second peak detection circuits includes an upper peak hold circuit for retaining an upper peak of the respective signal, a lower peak hold circuit for retaining a lower peak of the respective signal, and a subtraction circuit for obtaining a level difference between the upper and lower peaks and utilizing the level difference as the peak level.

7. The signal synthesizing apparatus according to claim 6, wherein each of the first and second peak detection circuits includes a high pass filter upstream of the peak hold circuit.

8. The signal synthesizing apparatus according to claim 1, wherein the reference level comprising the signal level of one of the plurality of signals includes an average of signal levels of at least two of the plurality of signals.

9. A signal synthesizing method comprising:

receiving a light beam returning from an optical disc upon radiating a reading beam of light to the optical disc;

producing a plurality of signals in accordance with optical intensities of the received light beam;

adjusting signal levels of the plurality of signals such that each of the signal levels of the plurality of signals becomes equal to a reference level determined from at least one of the signal levels of the plurality of signals; and synthesizing the plurality of signals after the signal levels are adjusted in said adjusting to obtain a synthesized signal, wherein the reference level comprises a signal level of one of the plurality of signals, and said adjusting adjusts signal levels of others of the plurality of signals such that each of the signal levels of the others of the plurality of signals becomes equal to the signal level of the one of the plurality of signals.

10. The signal synthesizing method according to claim 9, wherein said adjusting includes the substep of using a peak level of the one of the plurality of signals as the reference level signal.

11. The signal synthesizing method according to claim 10, further including passing only a high frequency portion of each of the plurality of signals before said adjusting.

12. The signal synthesizing method according to claim 10, further including:

detecting an upper peak of the one of the plurality of signals;

detecting a lower peak of the one of the plurality of signals;

obtaining a level difference between the upper and lower peaks; and using the level difference as the peak level.

13. The signal synthesizing method according to claim 12, further including passing only a high frequency portion of the signals before said adjusting.

14. The signal synthesizing method according to claim 9, wherein the reference level comprising the signal level of one of the plurality of signals includes an average of signal levels of at least two of the plurality of signals.

15. An apparatus comprising:

a plurality of detectors for receiving a light beam returning from an optical disc when a reading beam of light is radiated to the optical disc, and for producing a plurality of signals; and a level adjusting circuit for adjusting signal levels of the plurality of signals such that each of the signal levels of the plurality of signals becomes equal to a reference level determined from at least one of the signal levels of the plurality of signals, wherein the reference level comprises a signal level of one of the plurality of signals, and the level adjusting circuit adjusts signal levels of others of the plurality of signals such that each of the signal levels of the others of the plurality of signals becomes equal to the signal level of the one of the plurality of signals.

16. The apparatus according to claim 15, wherein the level adjusting circuit includes:
   a relay circuit for producing a reference level signal representing the signal level of the one of the plurality of signals; and
   an amplifying relay circuit for producing subordinate level signals representing the signal levels of the others of the plurality of signals respectively, and adjusting the signal levels of the others of the plurality of signals such that each of the subordinate level signals becomes equal to the reference level signal.

17. The apparatus according to claim 16, wherein the relay circuit includes a first peak detection circuit for using a peak level of the one of the plurality of signals as the reference level signal, and
   wherein the amplifying relay circuit includes:
      a plurality of variable gain amplifiers for amplifying the others of the plurality of signals with gains determined in accordance with respective control signals,
      a plurality of second peak detection circuits for using peak levels of output signals of the plurality of variable gain amplifiers as the subordinate level signals respectively, and
      a plurality of difference signal producing circuits for creating difference signals representing level differences between the reference level signal and the subordinate level signals respectively and using the difference signals as the respective control signals.

18. The apparatus according to claim 17, wherein each of the first and second peak detection circuits includes a peak hold circuit.

19. The apparatus according to claim 18, wherein each of the first and second peak detection circuits includes a high pass filter upstream of the peak hold circuit.

20. The apparatus according to claim 17, wherein each of the first and second peak detection circuits includes an upper peak hold circuit for retaining an upper peak of the respective signal, a lower peak hold circuit for retaining a lower peak of the respective signal, and a subtraction circuit for obtaining a level difference between the upper and lower peaks and using the level difference as the peak level.

21. The apparatus according to claim 20, wherein each of the first and second peak detection circuits includes a high pass filter upstream of the peak hold circuit.

22. The apparatus according to claim 15, wherein the reference level comprising the signal level of one of the plurality of signals includes an average of signal levels of at least two of the plurality of signals.

23. A signal synthesizing apparatus comprising:
   an optical pickup including a plurality of light receiving planes for receiving a light beam returning from an optical disc when a reading beam of light is radiated to the optical disc, and for producing a plurality of signals;
   adjusting means for adjusting signal levels of the plurality of signals such that each of the signal levels of the plurality of signals becomes equal to a reference level determined from at least one of the signal levels of the plurality of signals; and
   synthesizing means for synthesizing the plurality of signals after the signal levels of the plurality of signals are adjusted by the adjusting means to obtain a synthesized signal,
   wherein the adjusting means comprises a relay circuit including a signal line for transferring the one of the plurality of signals and a peak detection circuit for utilizing a peak level of the one of the plurality of signals on a signal line as the reference level signal.

24. The signal synthesizing apparatus according to claim 23, wherein said relay circuit produces a reference level signal representing the signal level of the one of the plurality of signals, and directly transfers the one of the plurality of signals to the synthesizing means.

25. A signal synthesizing apparatus comprising:
   an optical pickup including a plurality of light receiving planes for receiving a light beam returning from an optical disc when a reading beam of light is radiated to the optical disc, and for producing a plurality of signals;
   adjusting means for adjusting signal levels of the plurality of signals such that each of the signal levels of the plurality of signals becomes equal to a reference level determined from at least one of the signal levels of the plurality of signals; and synthesizing means for synthesizing the plurality of signals after the signal levels of the plurality of signals are adjusted by the adjusting means to obtain a synthesized signal,
   wherein the adjusting means comprises a plurality of amplifying relay circuits including:
      a plurality of variable gain amplifiers for amplifying the others of the plurality of signals with gains determined in accordance with respective control signals,
      a plurality of peak detection circuits for utilizing peak levels of output signals of the plurality of variable gain amplifiers as the subordinate level signals respectively, and a plurality of difference signal producing circuits for creating difference signals representing level differences between the reference level signal and the subordinate level signals respectively and utilizing the difference signals as the respective control signals, and
   wherein said plurality of amplifying relay circuits produce subordinate level signals representing the signal levels of the others of the plurality of signals respectively, adjust the signal levels of the others of the plurality of signals such that each of the subordinate level signals becomes equal to the reference level signal, and supply the others of the plurality of signals having the adjusted signal levels to the synthesizing means.

* * * * *